2 Sheets—Sheet 1.

T. J. BLAKE.

Assignor of one-half to C. H. BRACE.

STARCHING MACHINE.

No. 11,109. Reissued Sept. 2, 1890.

WITNESSES:

Damon S. Wolcott

F. E. Gaither.

INVENTOR,

Thomas J. Blake, by George H. Christy

Att'y

T. J. BLAKE.

Assignor of one-half to C. H. BRACE.

STARCHING MACHINE.

No. 11,109. Reissued Sept. 2, 1890.

WITNESSES:

Damon S. Wolcott

F. E. Gaither.

INVENTOR,

Thomas J. Blake by George H. Christy Att'y

UNITED STATES PATENT OFFICE.

THOMAS J. BLAKE, OF PITTSBURG, PENNSYLVANIA, ASSIGNOR OF ONE-HALF TO CLINTON H. BRACE, OF SAME PLACE.

STARCHING-MACHINE.

SPECIFICATION forming part of Reissued Letters Patent No. 11,109, dated September 2, 1890.

Original No. 400,184, dated March 26, 1889. Application for reissue filed June 6, 1890. Serial No. 354,517.

*To all whom it may concern:*

Be it known that I, THOMAS J. BLAKE, a citizen of the United States, residing at Pittsburg, in the county of Allegheny and State of Pennsylvania, have invented certain new and useful Improvements in Starching-Machines; and I do hereby declare the following to be a full, clear, and exact description of the invention, reference being had to the accompanying drawings, which form part of this specification.

This invention has relation to starching-machines, and especially to that class of machines particularly designed and adapted for starching shirts and other large articles of underwear.

The object of my invention is to provide means whereby the starch will be forced into and through every part of the fabric, while ample and efficient provision is made for the escape of the air from the folds and cavities while the articles are being pressed.

My invention has for its further object the provision of novel means for automatically removing the surplus starch from each article after it has been thoroughly saturated or impregnated.

My invention consists in the novel construction, combination, and arrangement of parts, as hereinafter described, and specifically claimed.

Figure 1:
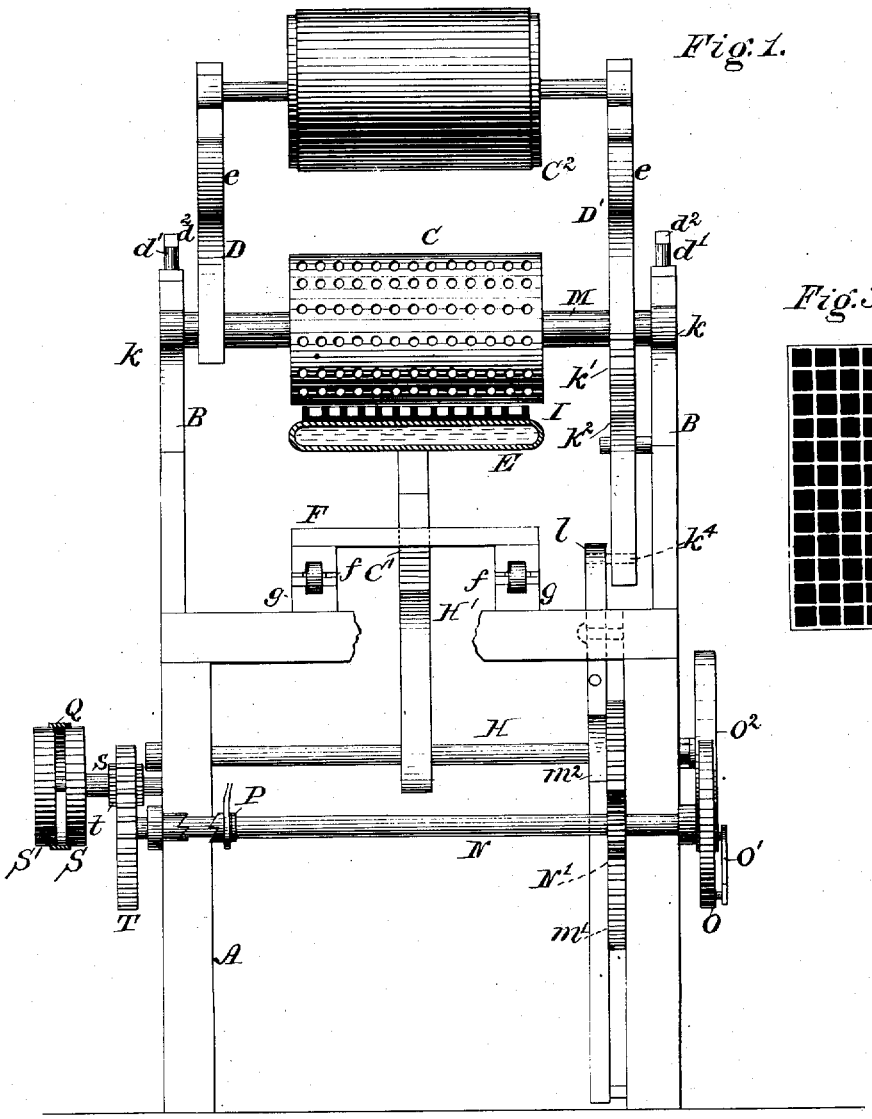
Figure 3:
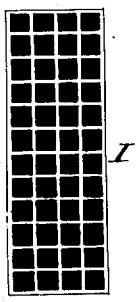
Figure 2:
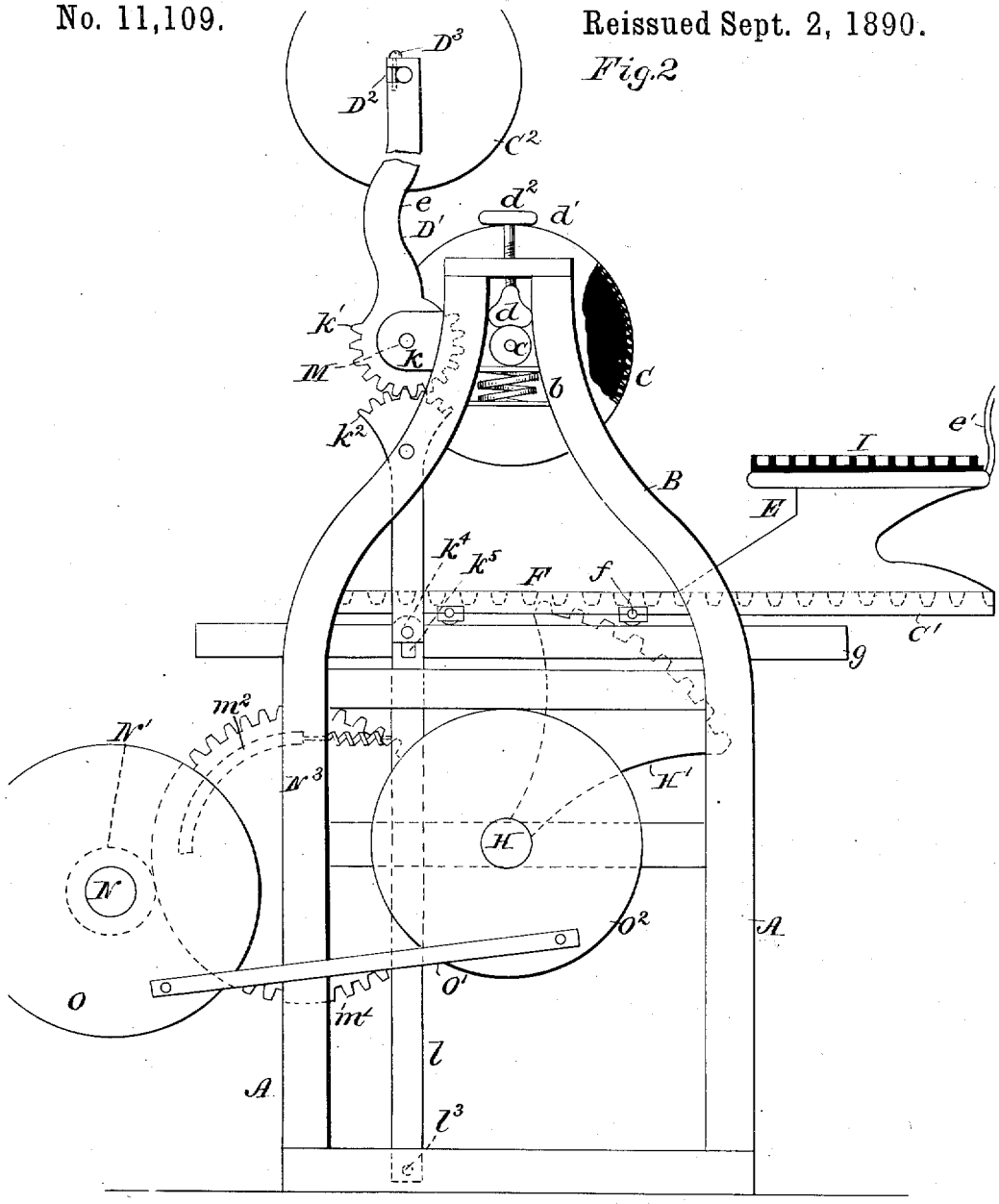

In the accompanying drawings. Figure 1 is an end view, and Fig. 2 a side elevation, of my improved starching-machine, and Fig. 3 a detail view of the mat.

A designates a rectangular frame, upon which are supported the working parts of the machine.

B B are standards or brackets supporting above the frame A the perforated cylinder C and the pivotal arms D D′, which carry the wiping-roller $C^2$.

E designates the starching-table, which consists of a shallow oblong metallic box having a horizontal surface and adapted to contain hot water, which is supplied thereto from a boiler by means of a hose *e′*. This table is mounted on a platform F, to which are journaled rollers or wheels *f f*, arranged to travel on suitable ways or in grooves or channels formed in the track-bars *g g*, laid upon and running lengthwise of the main frame A.

A horizontal toothed rack C′ is attached to the under side of the platform F, and the latter receives reciprocating motion in the direction of its length from a transverse shaft H, mounted on the frame A, by means of a toothed segment H′, fitted to said shaft and engaging with the teeth of the rack C′.

To the upper surface of the table E is secured a web or mat I, consisting of a sheet of rubber having its surface indented so as to form a large number of cavities to receive and hold the starch, which is fed thereto in any convenient manner.

The roll C is preferably constructed of brass or copper in the form of a hollow cylinder or shell and is mounted on a shaft *c*, having its ends supported in the side pieces or brackets B B. The cylinder C rotates upon its shaft, while the ends of the latter rest upon springs *b b* and are pressed down by means of rubber blocks *d*, to which are attached adjusting-screws *d′ d′*, turning in bearings in the tops of the brackets B B and provided with hand-wheels $d^2$ on their upper ends. The cylinder C is perforated, the holes being preferably arranged in close proximity, so as to allow the air to escape from the fabric when the starching-table is passing under the cylinder and into the cylinder. When a solid or imperforated cylinder is used, no escape for the air is provided, and its accumulation and retention inside the folds of the fabric greatly interferes with the entrance of the starch and thorough impregnation and saturation of the articles. The starch on the surface, instead of being driven into and through the fabric, is forced back by the roll onto the table or off on the sides or ends. The cylinder C is so situated that its surface and the surface of the mat I upon the table are in close pressure contact when the latter is passing under the cylinder. The pressure, however, is not rigid, but is made yielding by the rubber blocks *d*, which allow the cylinder to adapt itself to the varying thickness of the goods.

The wiping-roll $C^2$ consists of a cylinder, of wood or other material, having a cloth cover in several folds or layers, and is intended and adapted to be swung down upon the starching-table in contact with the goods at intervals—that is, after the table has passed a sufficient number of times under the perforated roll and the goods have taken up enough starch the wiping-roll takes up the surplus starch from the goods and leaves them in condition for the next operation.

In the machine under consideration the wiping-roll is brought into play after every fourth movement of the starching-table, and its action is governed by the mechanism to be described.

The arms D D′, by which the wiping-roll is carried, are attached to a transverse shaft M, journaled in the arms $k$ $k$, projecting from the edges of the brackets B B. The arm D′ is formed or provided at its lower end with a toothed segment $k'$, which engages with a toothed lever $k^2$, pivoted to the side of one of the brackets B B. At its lower end the lever $k^2$ is coupled by means of a lateral pin or pivot $k^4$, passing through a slot $k^5$ in a swinging bar $l$, which is pivoted at $l^3$ to one of the sides of the frame A, the several parts being so arranged that any motion imparted to the bar $l$ will be transmitted to the arms D D′. Normally the arms D D′ are in an upright position, as shown in black lines in Fig. 1, the wiping-roll being nearly directly above the perforated cylinder. The shaft M, supporting arms D D′, is journaled about on a line with the shaft of the roll C, and the arms D D′ are bent at $e$ to allow the wiping-roll to reach the table. In the position shown the arms are maintained until otherwise required by the tension of a spring $N^3$ upon the bar $l$, which also serves to return the wiping-roll to the position shown after it has done its work.

The movement of the wiping-roll is effected through the medium of an offset or cam $m^2$ on the face of a toothed wheel $m'$, journaled to the frame A. A transverse main power-shaft N carries a pinion N′, which engages with the wheel $m'$, and is proportioned so as to make four revolutions to one of the wheel $m'$. Upon one end of the shaft N is a crank-wheel O, which is connected by a pitman O′ with a crank-wheel $O^2$ on the end of the shaft H, so that the revolution of the wheel O will produce an oscillation or reciprocation of the wheel $O^2$ and rectilinear or horizontal reciprocation of the starching-table through the medium of the segment H′ and rack C′.

At every fourth revolution of the shaft N and every single revolution of the wheel $m'$ the offset or cam $m^2$ comes in contact with and swings or moves the bar $l$ to one side, thus causing the wiping-roll to fall upon or in the way of the starching-table, where it remains during the backward movement of the table from beneath the cylinder C and gathers up the starch remaining unused upon the surface of the goods. After the cam $m^2$ has passed the bar $l$ the latter is thrown back into position and the wiping-roll is raised.

The wiping-roll and shaft are detachable, so that when the former has accumulated a large amount of starch it can be taken out and soaked in warm water to wash out the starch, a new roll being meanwhile substituted. For the purpose of allowing the wiping-roll with its shaft to be detached the arms D D′ are notched, as shown at $D^2$, to receive the ends of the shaft, which is held in place by removable pins $D^3$.

The main shaft N is provided with suitable clutch mechanism P, whereby it may be thrown into and out of gear with the toothed wheel T in mesh with pinion $t$ on main pulley-shaft $s$.

S S′ are fast and loose pulleys which carry a shifting-belt Q, by which the machine may be started and stopped at pleasure.

The clutch P is employed in stopping and starting the machine between starching operations.

Having described my invention, what I claim, and desire to secure by Letters Patent, is—

1. In a starching-machine, the combination of a starch-containing table or carrier upon which the articles to be starched are laid and a presser for forcing the articles against such table, and provided with perforations for the escape of air, substantially as set forth.

2. In a starching-machine, the combination of a starch-containing table or carrier upon which the articles to be starched are laid and a roll for forcing the articles against such table, and provided with perforations for the escape of air, substantially as set forth.

3. In a starching-machine, the combination of a starch-containing table or carrier upon which the articles to be starched are laid and a hollow roll provided with perforations for forcing the articles against the table, substantially as set forth.

4. In a starching-machine, a detachable wiping-roll consisting of a cylinder mounted on adjustable arms and capable of being lowered upon and raised from the starching table or carrier, substantially as described.

5. In a starching-machine, the combination, with the reciprocating starching-table, of the pivotal arms D D′, toothed segment $k'$ upon one of said arms, the toothed lever $k^2$, mounted on the frame of the machine, lever $l$, pivotally connected to lever $k^2$, wheel $m'$, having offset $m^2$, pinion N′, and transverse shaft N, substantially as described.

6. In a starching-machine, the combination of the following elements, to wit: the wiping-roll, the toothed lever supporting the same, the toothed segmental lever, the swinging bar, the toothed wheel having a cam or offset on its face, and the pinion engaging with said wheel and mounted on the shaft, substantially as described.

7. In a starching-machine, the combination, with the reciprocating starching-table, the pressure-roll, and the wiping-roll, of the transverse shafts through which motion is conveyed to the table and to the arms supporting the wiping-roll, the crank-wheels on said shafts, and the connecting-pitman, substantially as described.

In testimony whereof I have hereunto set my hand.

THOMAS J. BLAKE.

Witnesses:
W. B. CORWIN,
DARWIN S. WALCOTT.